Oct. 22, 1968
J. R. HUDSON
3,406,478
FISHING LURE
Filed Sept. 28, 1965
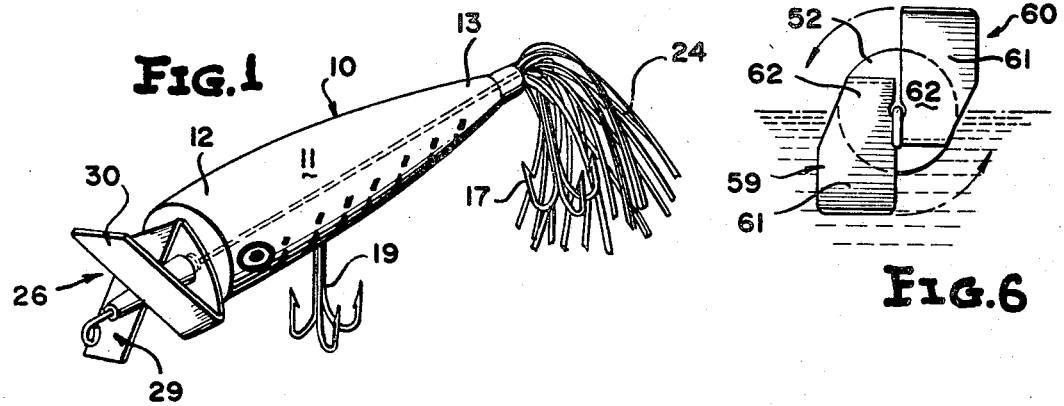
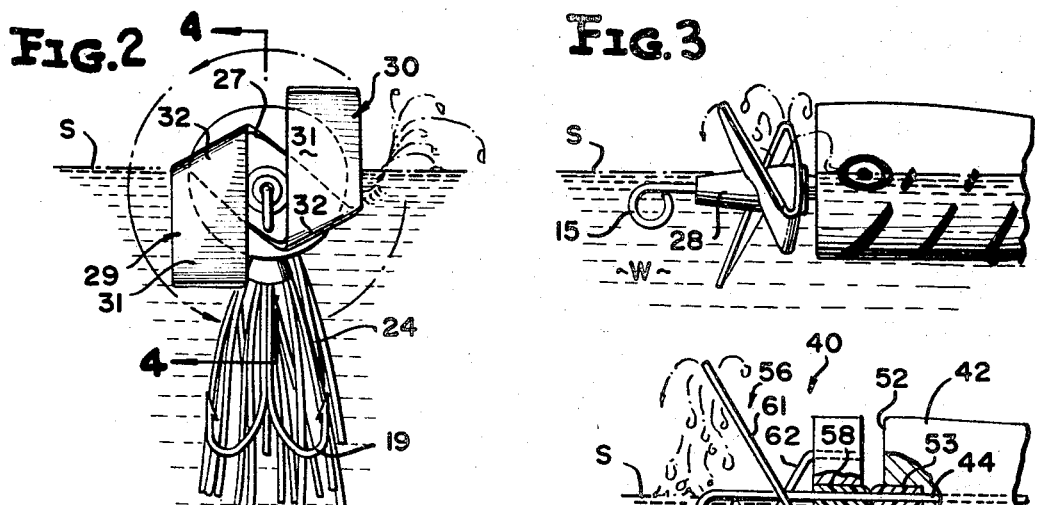
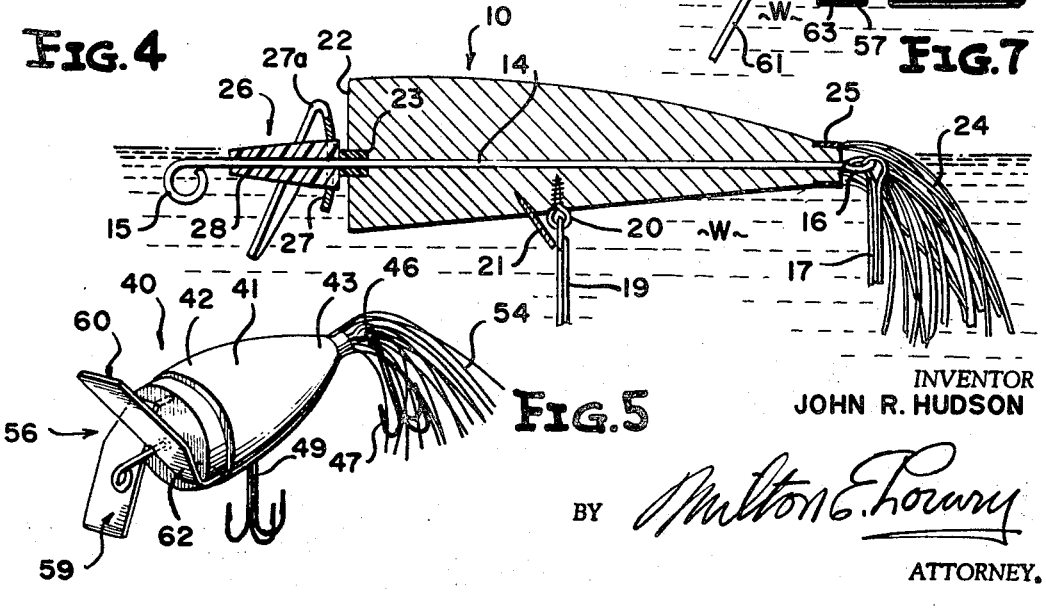
INVENTOR
JOHN R. HUDSON
BY *Milton E. Lowry*
ATTORNEY.

United States Patent Office 3,406,478
Patented Oct. 22, 1968

3,406,478
FISHING LURE
John R. Hudson, Tar Springs Drive,
Greenville, Ky. 42345
Filed Sept. 28, 1965, Ser. No. 490,786
6 Claims. (Cl. 43—42.17)

ABSTRACT OF THE DISCLOSURE

A fishing lure comprising an elongated body having front and rear end portions, hook means carried by said body, a spinner, means journaling said spinner for rotating forwardly of the said front end portion. The spinner includes a pair of blade portions which are in diverging relationship to each other in a direction away from the said front end of the elongated body. The purpose of this construction is to attain a spluttering, splashing action as the lure is retrieved through the water.

---

This invention relates to a novel fishing lure, and is particularly directed to a fishing lure which authentically simulates the movements of a live creature, is relatively snag-proof, and is comparatively inexpensive to manufacture.

An object of this invention is to provide a novel fishing lure of the spinner-type characterized by the rotatable journaling of a spinner forwardly of a front end portion of the lure body, and the spinner including a plurality of diverging blades which produce a spluttering splashing effect when the lure is retrieved through water, thus simulating the movements of live creatures and inducing strikes by game fish, such as large and small mouth bass, pickerel, and other above and below surface feeders.

Still another object of this invention is to provide a novel fishing lure comprising an elongated body having front and rear portions, hook means carried by the body, a spinner, the spinner including a plurality of blades, the blades being in diverging relationship to each other in a direction away from the front end portion, a major portion of one of the blades being located to one side of a plane through the axis of rotation of the spinner, and a major portion of another of the blades being located at a side of the plane opposite the one side whereby the major portions of the spinner are influenced by the force of the water as the lure is retrieved to accurately simulate the movements of live bait which induces strikes by game fish.

A further object of this invention is to provide a novel lure of the type immediately above defined in which the inner edges of the major portions of the blades are in parallel relationship to each other and to a plane parallel to the axis of rotation of the spinner, said plane passing between said inner edges, and the spinner is constructed from a single piece of metallic material.

Another object of this invention is to provide a lure of the type heretofore described in which the blades also include minor portions in converging relationship to each other in a direction forwardly of said body, and the blades are inclined relative to a plane normal to the axis of rotation of the spinner.

The above and other objects are accomplished in a manner which will be readily apparent from the following description and the annexed drawing in which:

FIG. 1 is a front perspective view of a fishing lure constructed in accordance with this invention, and illustrates a novel spinner journaled for rotation forwardly of a body of the lure, and the diverging relationship of terminal end portions of a pair of spinner blades;

FIG. 2 is an enlarged front view of the fishing lure of FIG. 1, and illustrates the rotation of the spinner and the generally parallel relationship of the spinner blades;

FIG. 3 is a fragmentary side elevational view of the fishing lure, and more clearly illustrates the particular configuration of the spinner;

FIG. 4 is a sectional view taken generally along line 4—4 of FIG. 2, and illustrates the means for journaling the spinner for rotation relative to the lure body;

FIG. 5 is a front perspective view of another fishing lure constructed in accordance with this invention, and illustrates a modified spinner of the fishing lure;

FIG. 6 is a front view of the fishing lure of FIG. 5, and illustrates the particular configuration of a pair of blades of the fishing lure; and FIG. 7 is a fragmentary side elevational view of the lure of FIGS. 5 and 6 with parts broken away for clarity, and illustrates the means for journaling the spinner for rotation relative to the lure body.

A novel fishing lure constructed in accordance with this invention is illustrated in FIGS. 1–4 of the drawing, and is generally referred to by the reference numeral 10. The fishing lure 10 comprises a generally elongated plastic or wood body 11 having a forward end portion 12 tapering toward a rear end portion 13. A wire or rod 14 passes through the lure body 11 and terminates in eyelets or loops 15, 16 at the forward and rear end portions 12, 13, respectively. Hook means 17 in the form of a triple hook is secured to the eyelet 16, while a similar triple hook 19 is secured to the lure body 11 by an eye-screw 20 (FIG. 4). A weed guard 21 is located forwardly of the eye-screw 20 and deflects weeds from the hook 19 in a known manner as the lure 10 is retrieved through the water W, on or below the surface S thereof.

The front or forward end portion 12 of the lure body 11 is provided with a flat circular surface 22 (FIG. 4). The surface 22 is provided with a socket or recess (unnumbered) in which is fixedly secured a sleeve or journal 23 in external telescopic relationship to the wire 14.

A skirt or tailpiece 24 is secured to the rear end portion 13 of the lure body 11 by an elastic band portion 25 which is bonded by an adhesive to a cylindrical reduced end (unnumbered) of the rear end portion 13. The tailpiece 24 includes a plurality of flexible strands (unnumbered) of plastic, string, foil, feathery or similar material which functions to attract fish because of the movement thereof as the lure 10 is retrieved, and also hides the hook 17.

A spinner 26 is positioned forwardly of the front surface 22 of the lure body 11. The spinner 26 is constructed from a single piece of metallic material and includes a medial or central portion 27 which is fixed to a plastic journal 28 mounted for rotation upon the wire 14. The plastic-to-plastic contact between the journals 23, 28 permits low-friction rotation of the spinner 26 as the lure is retrieved through the water W. The medial portion 27 of the spinner 26 is generally normal to the axis of the wire 14 and is integrally joined by bent portions 27a to a pair of blades or blade portions 29, 30.

The blades 29, 30 are identical and include major and minor portions 31, 32, respectively. The terms major and minor are used in the sense of indicating the maximum areas of the blades 29, 30 which are completely submerged in the water W during the operation of the lure 10. This is readily apparent in FIG. 2 of the drawings in which the major portion 31 of the blade 29 is submerged below the water surfaces S and the minor portion 32 is above the surface S. At the same instant of rotation illustrated in FIG. 2 the minor portion 32 of the blade 30 is generally submerged while the major portion 31 of the blade 30 is above the water surfaces S. This construction permits a maximum area of the blades 29, 30 to be affected by the water W during the retrieving of the lure whereby maximum rotation of the spinner 26 of the lure 10 is achieved.

The minor portions 32, 32 of the blades 29, 30 converge toward each other away from the front surface 22 (FIG. 3) while the major portions 31, 31 diverge away from each other in the same direction to impart a generally criss-cross configuration to the spinner 26 as viewed in side elevation. The inner edges of the blades 29, 30 are substantially parallel to each other when viewed from the front thereof and to a plane parallel to the body axis and passing between the said inner edges of the blades, as is best shown in FIG. 2 of the drawing. The blades 29, 30 are also inclined relative to a plane normal to the axis of the body 11 which causes counter clockwise rotation of the spinner 26 during the retrieval thereof, as is indicated by the headed arrows in FIG. 2 of the drawing. The blades 29, 30 can, of course, be inclined in an opposite direction to impart clockwise direction to the blades, as viewed in FIG. 2.

A further description of the spinner blades in FIG. 2 includes another plane passing through the axis of rotation of the spinner and through a location on both of the inner edges of the blades. A plane thus drawn shows the major portions of each blade to be on opposite sides of the plane. Therefore, the major portions are influenced by the force of the water as the lure is retrieved. This plane passing through a location on the spinner edges is inherently perpendicular to the above mentioned plane passing between the inner edges.

In operation, the fishing lure 10 is attached to a conventional fishing line or leader (not shown) by means of the eyelet 15. After the lure 10 is cast, it is retrieved by a steady or jerky pull upon the fishing line wherein the resistance of the water W upon the blades 29, 30 causes the rotation thereof in either a continuous or intermittent fashion, respectively. The rotation of the spinner 26 and the movement imparted to the body 11 thereby effects a sputtering, splashing type action which accurately simulates the actions of a live creature. An important effect produced by the lure 10 is the ability of the spinner 26 to "throw" water above the surface S, as is best shown in FIGS. 2 and 3 of the drawing. The water W is thrown upward by the recess (unnumbered) between each minor portion 32 and the medial portion 27 as the recess rotates upwardly from beneath and break the water surface S. Because of the major portions 31, 31 being immersed in the water W (approximately 75% submerged) a sharp downward force is exerted against the diverging and inclined blades 29, 30 which lower the spinner with a sharp, fast counterclockwise action, additionally aiding the movement of the lure 10. Each of these actions and movements also causes the skirt 24 and the hooks 17, 19 to shake which simulates the moving legs, tail feathers, or fur of a swimming creature. During the retrieval of the fishing lure 10 the broad blades 29, 30 also clear a path through the water by throwing weeds and small pieces of debris to either side of the lure 10 whereby snagging or fouling of the hooks 17, 19 is materially reduced.

Another fishing lure constructed in accordance with this invention is illustrated in FIGS. 5–7 of the drawings, and is referred to by the reference numeral 40. The fishing lure 40 is similar to the fishing lure 10 and comprises a generally elongated plastic or wood body 41 having a forward end portion 42 tapering toward a rear end portion 43. A wire or rod 44 passes through the lure body 41 and terminates in eyelets or loops 45, 46 at the forward and rear end portions 42, 43, respectively. Hook means 47 in the form of a triple hook is secured to the eyelet 46, while a similar triple hook 49 is secured to the lure body 41 by an eye-screw (not shown) corresponding to the eye-screw 20 of the lure 10 (FIG. 4). A deflector or weed guard (also not shown) corresponding to the deflector 21 (FIG. 4) is also associated with the hook 49.

The front end portion 42 of the lure body 41 is provided with a flat circular surface 52 (FIG. 7). The surface 52 is provided with a socket or recess (unnumbered) in which is fixedly secured a sleeve or journal 53 in external telescopic relationship to the wire 44.

A skirt or tailpiece 54 is secured to the rear end portion 43 of the lure body 41 by a band portion corresponding to the band portion 25 of the tailpiece 24. The function and construction of the tailpiece 54 is identical to that of the tailpiece 24.

A spinner 56 is positioned forwardly of the front surface 52 of the lure body 41. The spinner 56 is constructed from three separate pieces of material and includes a separate medial plastic or wooden portion 57 which is fixed to a plastic journal 58 mounted for rotation upon the wire 44. The plastic-plastic contact between the journals 53, 58 permits low friction rotation of the spinner 56 as the lure 40 is retrieved through the water W. The medial portion 57 is substantially of a shallow cylindrical configuration and is normal to the axis of the wire 44. The medial portion 57 is secured to a pair of individual blades or blade portions 59, 60.

The blades 59, 60 are identical and include major, minor and terminal portions 61, 62 and 63, respectively. The terms major and minor are used hereinafter in the same sense as that described heretofore with respect to the lure 10. The blades 59, 60 are substantially identical to the blade portions 29, 30 and a complete description thereof is deemed unnecessary for a complete understanding of this invention. However, it is to be noted that the minor portions 62, 62 of the blades 59, 60 narrow from the major portions 61, 61 toward the medial portion 57, and the terminal portions 63 of the blades 59, 60 are fixedly secured in sockets (unnumbered) of the medial portion which are in generally parallel relationship to the axis of the wire 44 and the body 41.

The operation of the fishing lure 40 is identical to the operation heretofore described with respect to the fishing lure 10. Furthermore, while both of the lures 10, 40 have been described in the preferred embodiment of the invention as "surface" lures, appropriate balance and weight increases would adapt the lures for sub-surface operation.

I claim:

1. A fishing lure comprising an elongated body having front and rear end portions, hook means carried by said body, a spinner, said spinner having a medial portion and a plurality of blade portions projecting away from said medial portion, means journaling the medial portion of the spinner for rotation forwardly of said front end portion, each blade portion defining an acute angle with the medial portion whereby said blade portions are in criss-crossed relationship to each other, each blade portion including a minor portion adjacent said medial portion and a major portion remote from said medial portion, said minor portions being in converging relationship relative to each other in a direction away from said front end portion, said major portions being in diverging relationship relative to each other in a direction away from said front end portion, and said major portions being inclined relative to a plane normal to the axis of rotation of said spinner.

2. A fishing lure comprising an elongated body having front and rear end portions, hook means carried by said body, a spinner, said spinner having a medial portion and a plurality of blade portions projecting away from said medial portion, means journaling the medial portion of the spinner for rotation forwardly of said front end portion, each blade portion defining an acute angle with the medial portion whereby said blade portions are in criss-crossed relationship to each other, each blade portion including a minor portion adjacent said medial portion and a major portion remote from said medial portion, said major portions having inner edges and said minor portions being in converging relationship relative to each other in a direction away from said front end portion, said major portions being in diverging relationship relative to each other in a direction away from said front end portion, and said inner edges being in spaced parallel relationship to each other when viewed from the front thereof and to a plane between said inner edges and passing through the axis of rotation of said spinner, and said major portions being inclined relative to said plane.

3. A fishing lure comprising an elongated body having front and rear end portions, hook means carried by said body, a spinner, said spinner being constructed from a single piece of sheet material, said spinner having a medial portion and a plurality of blade portions projecting away from said medial portion, means journaling the medial portion of the spinner for rotation forwardly of said front end portion, each blade portion defining an acute angle with the medial portion whereby said blade portions are in criss-crossed relationship to each other, each blade portion including a minor portion adjacent said medial portion and a major portion remote from said medial portion, said minor portions being in converging relationship relative to each other in a direction away from said front end portion, said major portions being in diverging relationship relative to each other in a direction away from said front end portion, and said major portions being inclined relative to a plane normal to the axis of rotation of said spinner.

4. A fishing lure comprising an elongated body having front and rear end portions, hook means carried by said body, a spinner, said spinner being constructed from a one-piece medial portion and a plurality of individual blade portions secured to said medial portion and projecting away therefrom, means journaling the medial portion of the spinner for rotation forwardly of said front end portion, each blade portion defining an acute angle with the medial portion whereby said blade portions are in criss-crossed relationship to each other, each blade portion including a minor portion adjacent said medial portion and a major portion remote from said medial portion, said minor portions being in converging relationship relative to each other in a direction away from said front end portion, said major portions being in diverging relationship relative to each other in a direction away from said front end portion, and said major portions being inclined relative to a plane normal to the axis of rotation of said spinner.

5. A fishing lure comprising an elongated body having front and rear end portions, hook means carried by said body, a spinner, said spinner having a medial portion and a plurality of blade portions projecting away from said medial portion, means journaling the medial portion of the spinner for rotation forwardly of said front end portion, each blade portion defining an acute angle with the medial portion whereby said blade portions are in criss-crossed relationship to each other, each blade portion including a minor portion adjacent said medial portion and a major portion remote from said medial portion, said major portions having inner edges, said minor portions being in converging relationship relative to each other in a direction away from said front end portion, said major portions being in diverging relationship relative to each other in a direction away from said front end portion, and said inner edges being in spaced parallel relationship to each other when viewed from the front thereof and to a plane between said inner edges and passing through the axis of rotation of said spinner.

6. A fishing lure comprising an elongated body having front and rear end portions, hook means mounted on said lure, a spinner having a medial portion and a pair of blade portions having a free space therebetween and projecting away from said medial portion, means journaling said spinner for rotation forwardly of said front end portion, each blade portion defining an acute angle with the medial portion whereby said blade portions are in criss-crossed relationship to each other, each said blade portion having a converging section with respect to each other and in a direction away from said front end portion and a diverging portion with respect to each other in a direction away from said front end portion.

References Cited
UNITED STATES PATENTS

| | | | |
|---|---|---|---|
| 2,711,044 | 6/1955 | Woods | 43—42.17 X |
| 1,584,100 | 5/1926 | Koepke | 43—42.2 |
| 2,606,387 | 8/1952 | Garner | 43—42.2 |
| 3,012,357 | 12/1961 | Helin | 43—42.17 |

SAMUEL KOREN, *Primary Examiner.*

D. J. LEACH, *Assistant Examiner.*